July 28, 1964 R. COLMAN 3,142,586

METHOD FOR THE MANUFACTURE OF PHOTOSENSITIVE ELEMENTS

Filed Dec. 11, 1961 4 Sheets-Sheet 1

INVENTOR.
ROBERT COLMAN

July 28, 1964 R. COLMAN 3,142,586

METHOD FOR THE MANUFACTURE OF PHOTOSENSITIVE ELEMENTS

Filed Dec. 11, 1961 4 Sheets-Sheet 2

INVENTOR.
ROBERT COLMAN

BY

ATTORNEYS

INVENTOR.
ROBERT COLMAN

BY

ATTORNEYS

FIG. 6
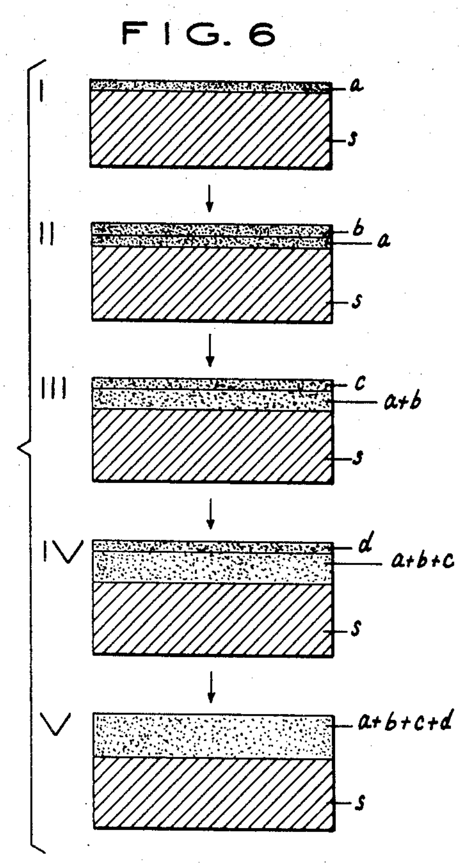
FIG. 7
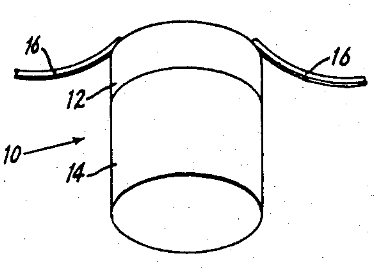
FIG. 8
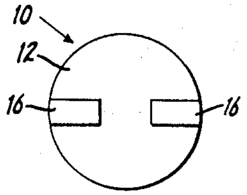
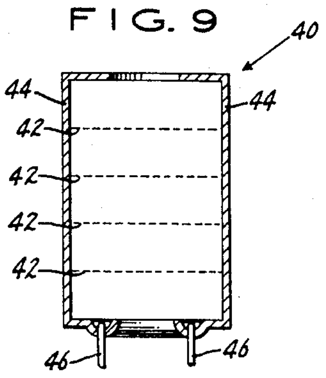
FIG. 10
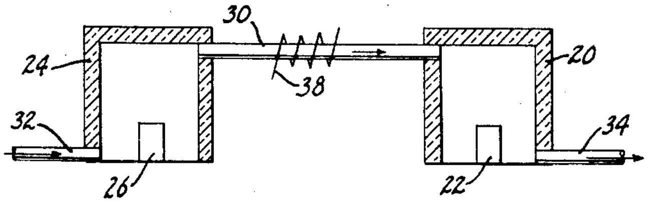
INVENTOR.
ROBERT COLMAN
BY
ATTORNEYS United States Patent Office 3,142,586
Patented July 28, 1964

3,142,586

METHOD FOR THE MANUFACTURE OF PHOTOSENSITIVE ELEMENTS

Robert Colman, New York, N.Y., assignor, by mesne assignments, to Clairex Corporation, New York, N.Y., a corporation of New York Filed Dec. 11, 1961, Ser. No. 158,334
16 Claims. (Cl. 117—215)

This invention is directed to improvements in photoconductive cells in which a change in electrical resistance occurs as a result of a change in illumination thereof, and to improvements in the manufacture of such cells.

A serious limitation in the manufacture of photoconductive devices results from the limited wave length sensitivity of particular photoconductive materials employed in such devices. For example, cadmium sulfide, one of the most commonly used photoconductive materials, has a response bandwidth of only about 40 millimicrons at a peak response wave length of about 5200–5300° A. In the case of photoconductive cells used in photography or as detectors of radiation, or in other applications, it is frequently desirable to obtain a broad bandwidth over a pre-selected, peak response spectral region.

With the conventional photocells, however, peak response bandwidth and wave length characteristics are determined by the photoconductive materials employed, and accordingly, the job frequently has to be tailored to the photocell, rather than the photocell being tailored to the job. Obviously, such a situation leaves much to be desired.

It is an object of the present invention to provide photoconductive elements having predetermined, broad bandwidth, peak spectral response characteristics, the characteristics being independent of the activity of the cell and being at least in part, a function of the physical dimensions of the cell.

Another object of the present invention is to provide photoconductive elements of the type described having peak spectral response and bandwidth characteristics which are different from the peak spectral response and bandwidth characteristics of the photoconductive materials from which the elements are made.

Another object of the present invention is to provide photocells having improved photosensitivity.

A further object of the present invention is to provide methods for manufacturing photosensitive elements having any of the aforementioned predetermined properties.

Other and further objects and advantages of the present invention will become apparent from the following description taken together with the drawings, wherein:

FIGURE 6 is a schematic flow sheet illustrating the steps in the manufacture of photosensitive elements according to the present invention;

FIGURE 7 is an isometric view of a photosensitive element made according to the teachings of the present invention;

FIGURE 8 is a top view of the photosensitive element shown in FIGURE 7;

FIGURE 9 is a cross section of another embodiment of the photoconductive element;

FIGURE 10 is a diagrammatic illustration of an apparatus suitable for use in preparing an embodiment of the present invention.

Figure 1:
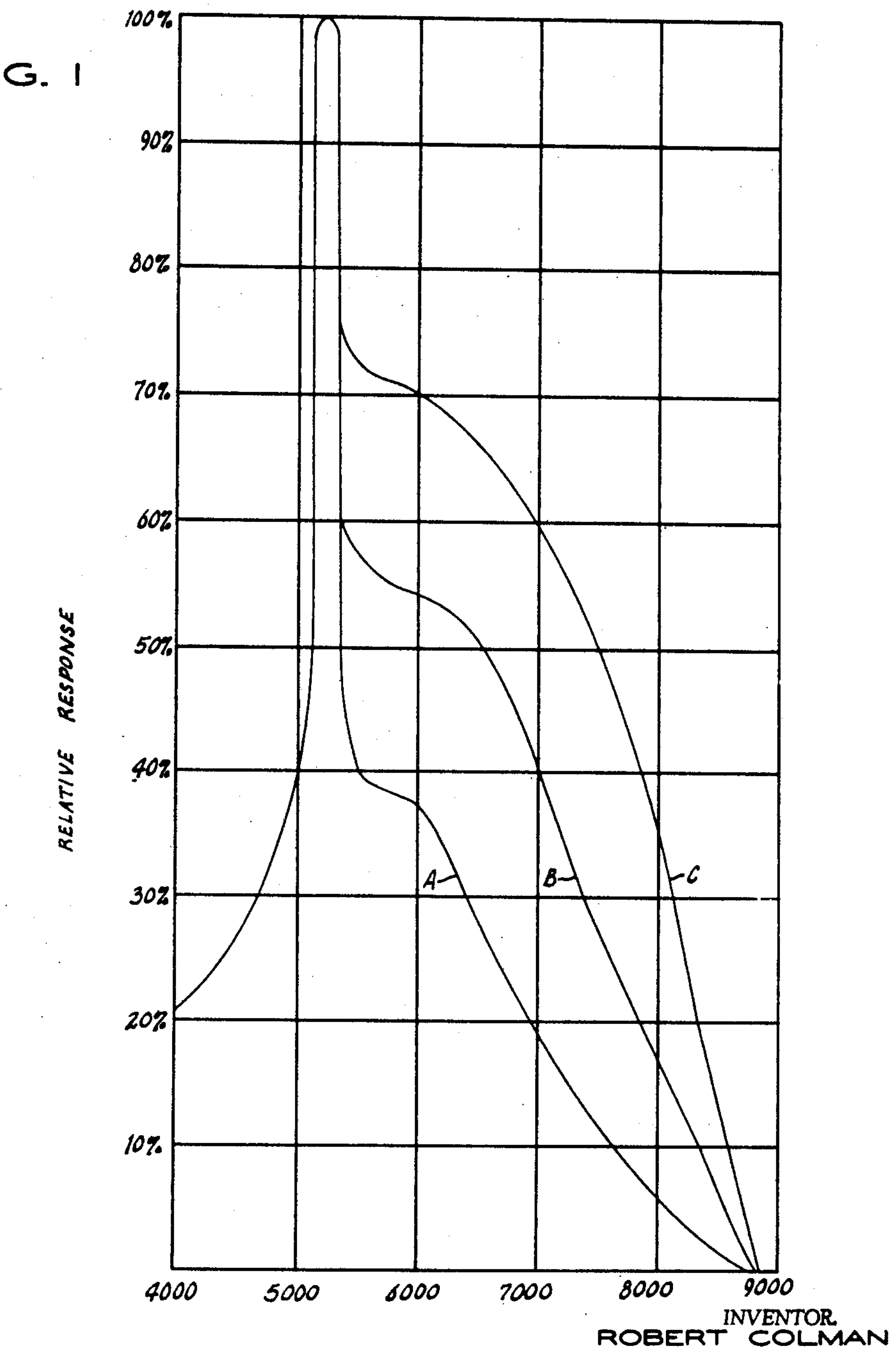
FIGURES 1 to 5 are charts useful in explaining the invention.

The photosensitive elements of the present invention comprise a plurality of layers or strata of a photoconductive material, the surfaces of each layer being in immediate, intimate and overall contact with each other, and each layer being individually deposited and individually light sensitized as taught herein prior to deposition of the next succeeding layer.

Each of the multiple layers making up the elements disclosed herein is in the form of an extremely thin plate or platelet, the surface area of the plate or platelet being large in comparison with the thickness. In general, each of the layers will have a uniform thickness of between about 1.5 and 4.5 microns.

As will be described more fully hereinbelow, with reference to FIGURE 6, the layers or strata will be coterminus or substantially co-terminus in surface area, so that the layers will be in overall or substantially overall planar contact with each other.

The photosensitive elements may be prepared by depositing, successively, a plurality of layers of a single polycrystalline photoconductive material. Following deposition of each layer or stratum, and prior to deposition of the next succeeding layer, each deposited layer is sensitized by heating at temperatures above at least 100° C., usually between about 300° and 900° C., and preferably between 500° and 700° C., and then cooled to ambient or room temperature. The temperature during heating may, if desired, approximate sintering temperature. The atmosphere during heating and cooling may be an inert gas, such as nitrogen or any of the so-called noble gases, e.g., argon, neon, and so forth. Ordinary atmospheric air is, however, satisfactory. Also, the atmosphere may contain activating or modifying agents, as will be made more clear hereinbelow. For best results the heating should be carried out in the presence of a halogen, e.g., chlorine, iodine, and bromine, and mixtures of the foregoing, preferably chlorine. The layers may be deposited by any of the well known techniques, such as by evaporation, spraying, floating or chemical deposition.

Heating the layers in the presence of a halogen has been found to photosensitize the host photoconductive materials in each layer. For the results herein described to be obtained, it is necessary to photosensitize each layer prior to deposition of the next succeeding layer.

Different, pre-selected, peak bandwidth and wave length spectral response characteristics may be obtained by varying the thickness and the number of the layers or strata described. Depending upon the response desired, and the particular photoconductive material used, the thickness of each layer may vary between about 1.5 and 4.5 microns, and is preferably between about 2 and 4 microns. At the lower limit, the number of layers employed will be at least 2. The number of layers that can be used in excess of 2 is theoretically infinite, each additional layer giving a refinement in the peak response bandwidth and the peak response wave length. As a practical mattter, however, the number of layers will very rarely be in excess of 10, and will ordinarily be less than 5, or between 2 and 5, including 2 and 5.

With the photoconductive elements described herein, the peak response bandwidth and the peak response wave length are both different from those characteristics of the photosensitive materials making up the layers.

The photoconductive material used to prepare each layer may be a single polycrystalline photoconductive material, or a mixture of polycrystalline materials. Although any of the well known photoconductive materials may be employed, best results are obtained with the sulfides, selenides, and tellurides of cadmium, zinc and mercury. Of these materials, the cadmium salts are preferred.

For each of the layers described, one of the photoconductive materials described herein, or a mixture thereof, will be selected. This will be referred to as the host material, for the reason that this basic or host photoconductive material may be altered by activators to increase the light sensitivity of the elements, or by modifying agents to shift even further the peak response wave length, or to broaden the peak response bandwidth, as will be made clear hereinafter.

The host photoconductive material need not be in compound form when deposited as a layer. Thus, when the photoconductive material is cadmium based, the layer deposited may be a mixture of elemental cadmium with elemental sulfur, tellurium, or selenium. Similar elemental mixtures may be used when the photoconductive material is zinc or mercury based.

Regardless of the type or combination of photoconductive materials used, it should be noted that the multilayer elements described herein have peak bandwidth and wave length characteristics different from the peak bandwidth and wave length characteristics of the photoconductive materials alone.

With some of the photosensitive host materials, the use of activators may be desirable to increase the activity, or more accurately, sensitivity of the elements. Such activators are well understood in the art, and include small amounts, e.g., 10 p.p.m. to 1000 p.p.m., preferably about 50 p.p.m. to 500 p.p.m. of copper, silver, gold, aluminum, silicon and halogens, including mixtures of the foregoing. The activators may be incorporated into the host polycrystalline material or materials either at the time the individual layer is deposited, or during the heating step. In either event, the activator will be present in the layer during heating. Regardless of whether other activators are present, as had already been brought out, the heating will take place in the presence of a halogen.

Figure 2:
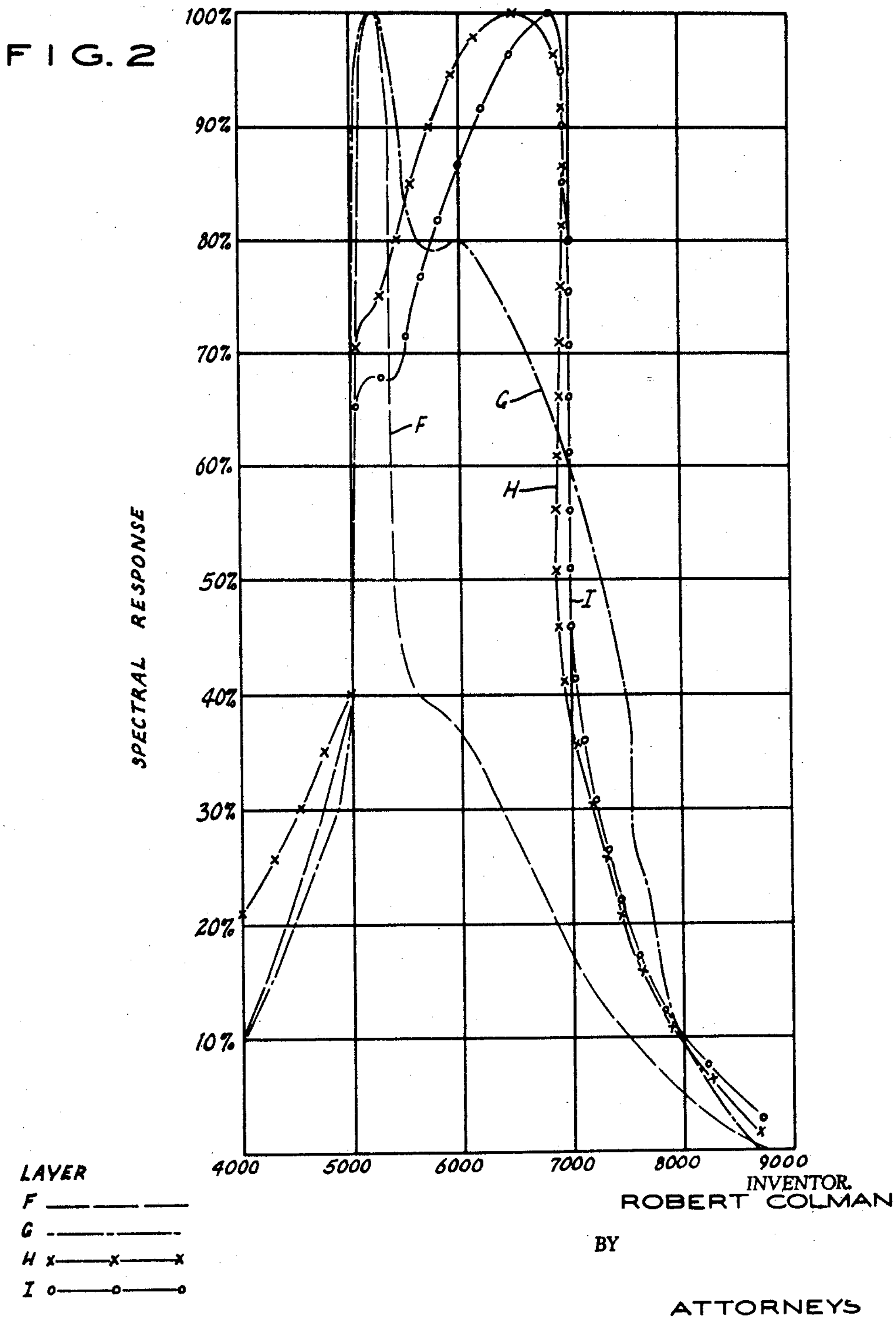

In each of FIGURES 1 and 2, characteristic curves are illustrated for various photocells, each of which contains a photoconductive element.

The host or primary photoconductive material for each and every curve in FIGURES 1 and 2 is polycrystalline cadmium sulfide.

The method of preparing the photocells whose characteristics are indicated by the curves of FIGURES 1 and 2 will be clear from the following examples.

*Example 1*

For comparison purposes, uni-layered photosensitive elements of varying thicknesses were prepared as follows: (1) very finely ground powder of spectrographically pure cadmium sulfide containing 10 p.p.m. copper was ground to particles ranging in average size between about 1 and 2 microns; (2) the granular solids were then mixed with water and ethanol to form a slurry containing about 1 percent solids and 99 percent liquids; (3) the slurry was then flowed on a refractory support with the crystals still in suspension. The granules were allowed to settle on the support uniformly. The excess liquid was then allowed to drain off and the granules allowed to dry at room temperature; (4) the coated support was then heated in an oven in the presence of chlorine for 2 hours at 500 to 700° C., (5) the heated support was then allowed to cool to ambient room temperature.

Using this procedure, three photoconductive elements, A, B and C, having a thickness of 2.8 microns, 5.6 microns and 13.2 microns, respectively, were prepared.

Terminals were attached to the top of each cell as shown in FIGURE 7, and spectral response characteristics were measured.

To obtain the curves shown in FIGURES 1 and 2, each photocell or photosensitive element was illuminated by a series of light beams at different wave lengths and constant incident radiant power while a constant voltage (60 volts D.C.) was applied to the terminals, and the resulting D.C. currents passing through the photocells were measured. The maximum current reading for each element was designated as 100 percent relative response, and all other readings were recorded as percentage responses with respect to the maximum electrical response.

In FIGURE 1, curves A, B and C illustrate the spectral response characteristics for photosensitive elements of 2.8 microns, 5.6 microns, and 11.2 microns, respectively, prepared as a single layer or stratum according to the procedure of Example 1.

As can be seen from FIGURE 1, increasing the thickness of the uni-layered elements produces no change in the peak response, wave length or bandwidth. With increasing thicknesses, however, the relative response over the broad end of the spectrum increases, as is indicated by the wider and higher skirts of the B and C curves to the right of the peak response wave length, as compared with curve A.

*Example 2*

This example illustrates the method of preparing the multi-layer photoconductive elements of the present invention.

A first layer of polycrystalline cadmium sulfide 2.8 microns thick was prepared as follows: (1) very finely ground powder of spectro-graphically pure cadmium sulfide containing 10 p.p.m. copper was ground to particles ranging in average size between about 1 and 2 microns; (2) the granular solid material was then mixed with water and alcohol to form a slurry containing about 1 percent solids and 99 percent liquids; (3) the slurry was then flowed on a refractory support with the crystals still in suspension. The granules were allowed to settle on the support uniformly. The excess liquid was then allowed to drain off and the granules allowed to dry at room temperature; (4) the cooled support was then heated in an oven in the presence of chlorine for 2 hours at 500 to 700° C.; (5) the heated support was then allowed to cool to ambient room temperature.

Steps 1 to 5 were repeated exactly to prepare second, third and fourth layers of cadmium sulfide polycrystalline material, each 2.8 microns thick.

Using the procedure of Example 1, the spectral response of the element was determined following complete formation of the first, second, third and fourth layers, respectively.

In FIGURE 2, curves F, G, H and I, respectively, indicate the spectral response characteristics of the element following deposition and heating in the presence of halogen of the first, second, third and fourth layers, respectively.

As can be seen from FIGURE 2, the peak spectral response wave length shifts from the short end of the spectrum to the long end with each additional layer, the shift being most pronounced between the second and third layers. Also there is a broadening of the peak response bandwidth as the number of layers increases.

Following deposition and heating of each layer, the element of Example 2 has a different spectral response, broader and with a shifting of the peak response toward the longer wave length regions of the spectrum, as is evident from FIGURE 2.

It should also be noted that the overall thickness of the elements corresponding to curves G and I of FIGURE 2 is identical to the overall thickness of the elements for curves B and C., respectively, of FIGURE 1; and that the elements of curves G and I in FIGURE 2 are identical to the elements of curves B and C of FIGURE 1, with the exception that elements H and I of FIGURE 2 are made by the multi-layer technique of Example 2, whereas the elements B and C of FIGURE 1 are made by the uni-layer technique of Example 1.

The advantages of the present invention accordingly will be immediately apparent from a comparison of FIGURES 1 and 2.

If the elements produced according to the multi-layered technique disclosed herein are cut into cross sections and examined under a microscope, following completion thereof, no interface or demarcation of whatsoever nature can be found. Additionally, as should already be clear, there is no dielectric or insulation of whatsoever nature between the layers of the elements disclosed herein.

In FIGURE 6, there is illustrated schematically the condition of the photoconductive element at stages I to V in the process.

In FIGURE 6, *s* representes the base layer or support which may be any suitable material, but is preferably a refractory material, such as procelain or other ceramic, glass, and the like.

In stage I of FIGURE 6, the first layer of photoconductive material, *a*, has been deposited on the base *s*, and the layer has been heated in the presence of halogen and cooled to ambient temperature.

At stage II in FIGURE 6, a second layer, *b*, has been superimposed on layer *a*, and the physical appearance if the element before heating layer *b* is shown.

At stage III in FIGURE 6, the unit has been heated to form the element $a+b$, and an additional layer *c*, unheated, has been superimposed thereon.

At stage IV in FIGURE 6, the unit has been heated to form the element $a+b+c$, and layer *d*, unheated, has been superimposed thereon.

At stage V in FIGURE 6, the unit has been heated to complete the multi-layered photoconductive element $a+b+c+d$, supported on the base *s*.

As will be clear from FIGURE 6, the layers as deposited down will generally be parallel or substantially parallel to each other.

FIGURES 7 and 8 show isometric and top views, resepectively, of a photoconductive unit in accordance with the present invention.

The element, indicated generally at 10, comprises a base 14 and the multi-layer photoconductive element 12. Contacting the top of the element are electrical conducting means or terminals 16.

As shown in FIGURES 7 and 8, the electrical conducting means 16 need only contact the upper or exposed surface of the element 12. If desired, however, the electrical conducting means 16 may also contact the sides of the element 12.

It is not necessary that the multi-layered element have a base or support. In FIGURE 9 there is shown an element 40 without a base. The dotted lines 42 indicate the various layers. These layers, of course, can not be be seen, and the lines 42 are for purposes of illustration only. Conducting means 44 contact the top, sides and bottom of the element and end in electrodes 46.

As will be clear from the foregoing, the separately superimposed, separately heated in the presence of halogen, and separately cooled layers of host photoconductive materials forming the devices disclosed herein are in intimate contact with one another. There is no dielectric or other separation between the layers. Nor is there a visible interface between the layers.

Although in any particular unit, each layer will ordinarily comprise the same photoconductive host material or combination of materials, it should be understood that for special purposes, the host material or combination of host materials in one or more of the layers may be different than that in the other layers.

Use of the multi-layer technique disclosed, in addition to altering the peak response bandwidth and wave length characteristics of the photoconductive materials, additionally leads to an increase in the light photocurrent of the materials, and more particularly to an increase in the light photocurrent to dark photocurrent ratio, this ratio being referred to in the art as photosensitivity of the cell. This characteristic will be made more clear from Example. 3.

*Example 3*

Using the procedure and materials of Example 2, cadmium sulfide was applied in three layers, each 2.8 microns thick. Following deposition, heating in the presence of halogen and cooling to ambient temperature of each layer, the light and dark currents of the unit were measured. Light current measurements were made at 2 foot candle illuminations. The potential across the cell during measurement of both light and dark photocurrent was 60 volts /D.C.

Following application of the first layer, the unit had a light photocurrent of 200 micro-amperes. In five seconds, the dark current was 0.002 micro-ampere. Another layer was applied, heated in the presence of halogen and cooled. The composite bi-layer device gave the following photo response: Light current was 400 micro-amperes at 2 foot candles. In five seconds the dark current was .02 micro-ampere. A rise of 2:1 in the light photocurrent and a 10:1 increase in the dark current was thus achieved. A third layer, of thickness identical with the other two was applied, heated in the presence of halogen, and cooled to ambient temperature, and measurements were made on the composite tri-layer element. The light current increased to 800 micro-amperes at 2 foot candles. In five seconds, the dark current had increased to only 0.2 micro-ampere.

In a further embodiment of the present invention, the peak response wave length of the multi-layer element may be further shifted, if desired. According to this embodiment, the photoconductive host material or combination of materials in each layer, during heating in the presence of halogen, or in the multi-layered element after complete formation thereof, is subjected to vapors of a material capable of entering into an ion exchange reaction with the host photoconductive material present in the layers, and capable, as a result of such reaction, of forming a photoconductive material with the host material. Typical of the vapors which may be employed with the photoconductive materials disclosed herein may be mentioned sulfur, selenium, tellurium, and mixtures of the foregoing.

The temperature of contact between the vapors and the element will ordinarily be between about 100 and 1400° C., preferably between about 500 and 900° C.

The vapors of the materials, such as selenium, tellurium, and sulfur, for use in the ion exchange reaction, may be prepared by heating these elements to a temperature at which the elements have a substantial vapor pressure, and then purging with an inert gas to cause entrainment of vapors of the elements. The inert gas entrained with the elemental vapors can then be brought into contact with each layer or with the multi-layered elements. Alternatively, the elements may be heated above their sublimation temperature or boiling point to produce the required vapors, which may then be brought into contact with each layer during heating in the presence of halogen or with the multi-layer unit as a whole.

Alternatively, the material capable of entering into a reaction with the host material to transform the spectral response of the element to a different spectral response may be placed inside the furnace during any of the heating steps disclosed herein. In this embodiment, the extraneous or non-host material need not be vaporized previous to contact with the layers or the multi-layer element, and the vapors of the non-host or extraneous material will be generated in situ, so to speak.

To cite an example of this embodiment, when the host material in the layers is cadmium sulfide, the peak response wave length may be shifted to the broad end of the spectrum by contacting each layer after or during heating in the presence of halogen, or the entire element after formation, with vapors of selenium, tellurium, and mixtures of the foregoing.

As another example, when the host material is cadmium selenide, shifts in peak response wave length and bandwidth are achieved by contact, as described hereinabove, with vapors of sulfur, tellurium, or mixtures of the foregoing. As a further illustration of this embodiment, when the host material is cadmium telluride, the peak response bandwidth and wave length may be shifted by contacting each layer after or during heating in the presence of halogen, or the overall element after formation, with sulfur and/or selenium vapors.

Figure 3:
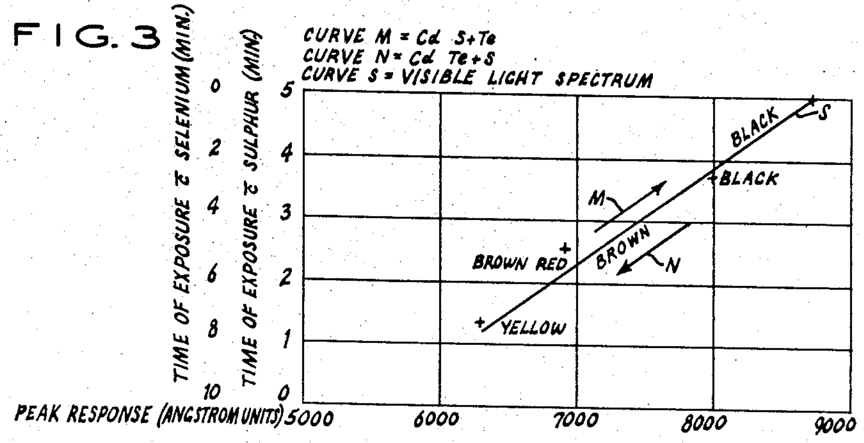
Figure 4:
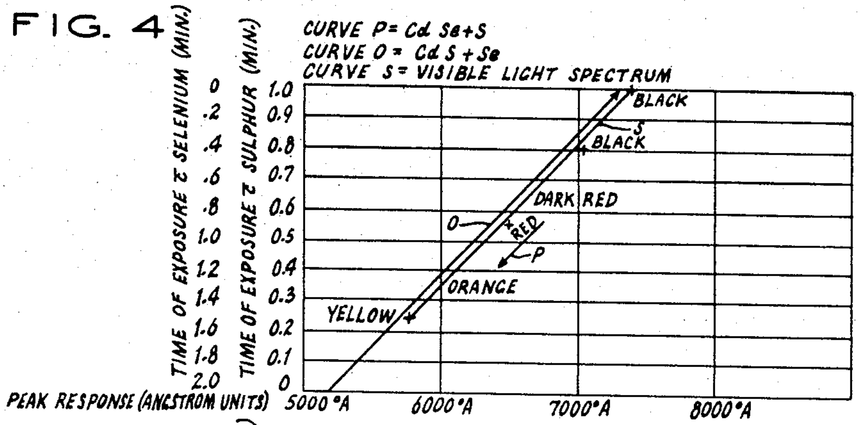
Figure 5:
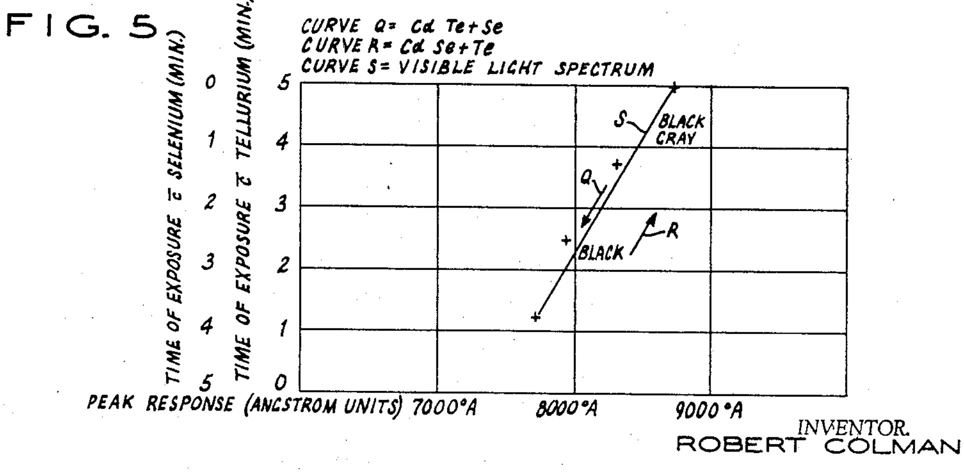

FIGURES 3, 4 and 5 are curves illustrating the shift in peak response wave length when the host material in the multi-layered elements are contacted with vapors of photosensitive materials different from the host material. Curve S in each of these figures indicates schematically the visible light spectrum, the visible light color ranges being printed thereon.

In FIGURE 3, curve M, the host material is cadmium sulfide, and the element has been subjected to tellurium vapors or, stated differently, doped with tellurium. For curve N of FIGURE 3, the host material is cadmium telluride, and the element has been doped with sulfur.

In FIGURE 4, curve O, the host material is cadmium sulfide, and the element has been doped with selenium. In curve P of FIGURE 4, the host material is cadmium selenide, and the host material has been doped with sulfur.

In FIGURE 5, curve Q, the host material is cadmium telluride, and the host material has been doped with selenium vapors. In curve R of FIGURE 5, the host material is cadmium selenide, and the host material has been doped with tellurium.

In FIGURES 3, 4 and 5, the ordinates of the curves represent the time of contact of the photoconductive unit with the doping agent in minutes. The abscissae of the curves represent peak responses in Angstrom units. The arrows on the curves indicate the direction in which the peak response is shifted, as a result of contact with the doping agent.

The following examples illustrate the embodiment of the present invention wherein the peak wave length response may be further shifted, if desired, by using the doping technique described.

*Example 4*

Multi-layer units of cadmium sulfide were prepared following the procedure of Example 2 and following completion, were placed in an oven at a temperature of about 500° to 700° C.

In a separate oven was placed metallic selenium and the temperature was raised to between about 500° and 700° C.

The apparatus used in this example is shown schematically in FIGURE 10, in which 20 represents the furnace containing the multi-layered element 22, and 24 represents the furnace containing the selenium 26. The furnaces are coupled by piping 30 provided with a heater 38, and furnace 24 is provided with a gas inlet 32, while furnace 20 is provided with a gas outlet 34.

An inert gas, such as nitrogen, preferably pre-heated to the temperature of furnace 24, is fed to furnace 24 via inlet 32, sweeps over the selenium 26 and picks up selenium vapors. The inert gas enriched with selenium vapors is fed into furnace 20 containing multi-layered element 22 via piping 30. Preheater 38 prevents cooling of the gases and precipitation of the selenium vapors in transit between the furnaces. The selenium vapors in the inert gas permeates the multi-layered element 22 in furnace 20 and causes a shift in the peak response wave length as indicated hereinabove.

The process is continued until enough of the selenium vapor is picked up by the multi-layered element to shift the peak response wave length of the element the desired amount. Using this technique, peak response wave length of the multi-layered element having cadmium sulfide as the host photoconductive material was shifted in the direction of the arrow on curve 0 in FIGURE 4 from 5100° A. to 7300° A. by varying the time of contact of the multi-layered elements with the selenium vapors from 0 to about 2 minutes.

*Example 5*

Example 4 was repeated, except that tellurium rather than selenium was purged with nitrogen at a temperature of about 800° C.; and the tellurium enriched nitrogen passed over the multi-layer element of Example 2.

The multi-layer element was held at a temperature of about 500 to 800° C. Using this technique, peak response wave lengths of multi-layered elements having cadium sulfide as the host material were shifted in the direction of the arrow on curve M, FIGURE 3, from 5200° A. to 8500° A. by varying the time of contact of the multi-layered elements with tellurium vapors from 0 to about 5 minutes.

The use of photoconductive materials other than cadmium sulfide in the present invention will be clear from the following examples.

*Example 6*

Using the procedure of Example 2, a tri-layered element of cadmium selenide polycrystalline material was prepared. Each of the layers had a thickness of 2.8 microns. As a control, a tri-layered unit of cadmium selenide 8.4 microns thick was prepared following the procedure of Example 1. The tri-layered unit had a peak response of 8725° A. as compared with a peak response of the control of 7300° A.

*Example 7*

Using the procedure of Example 2, a tri-layered element of cadmium telluride polycrystalline material was prepared. Each of the layers had a thickness of about 2.8 microns. As a control, a tri-layered unit of cadmium telluride was prepared following the procedure of Example 1. The tri-layered unit had a peak response of 8950° A. as compared with a peak response of the control of 8500° A.

*Example 8*

Using the procedure of Example 4, multi-layered units of cadmium selenide were subjected to sulphur vapors for varying periods of time. Peak response wave lengths of the multi-layered elements having cadmium selenide as the host material were shifted by this technique from 7300° A. to 5200° A. in the direction of the arrow of curve P of FIGURE 4 by varying the time of contact of the multi-layered elements with sulphur vapor from between about 0 and 1.0 minutes.

*Example 9*

Multi-layered elements of cadmium telluride were subjected to sulphur vapors using the procedure of Example 4 for varying periods of time. Using this procedure, peak response wave lengths of multi-layered elements having cadmium telluride as the host material were shifted in the direction of the arrow on curve N of FIGURE 3 from 8500° A. to 5200° A. by varying the time of contact with sulphur vapors from between about 0 and 5 minutes.

*Example 10*

Multi-layered elements of cadmium selenide were subjected to tellurium vapors using the procedure of Example 4 for varying periods of time. The peak response wave lengths of multi-layered elements having cadmium selenide as the host material were shifted in the direction of the arrow on curve R of FIGURE 5 from 7300° A. to 8500° A. by varying the time of contact with tellurium vapors from between about 0 and 5 minutes.

*Example 11*

Multi-layered elements of cadmium telluride were subjected to selenium vapors using the procedure of Example 4. The peak response wave lengths of multi-layered elements having cadmium telluride as the host material were shifted in the direction of the arrow on curve Q of FIGURE 5 from 8500° A. to 7300° A. by varying the time of contact with selenium vapors from between about 0 and 5 minutes.

As has already been indicated, the ion exchange reaction between the host material and the vapors of a different photoconductive material may occur following formation and heating of each layer if desired. In this embodiment, contact between the host material and the vapors of the doping material or materials may occur simultaneously during the heating step or may follow the heating step in the formation of each layer. When the overall element is subjected to the doping materials, this may conveniently be carried out simultaneously with heating of the last deposited layer. Of course, the ion exchange technique may also be employed following complete formation of the element.

The following examples are illustrative of the embodiment wherein elemental mixtures of photoconductive materials are employed.

*Example 12*

Example 2 is repeated with the exception that a mixture of elemental cadmium and elemental sulphur is substituted for cadmium sulfide. The elements are present in the mixture in stoichiometric proportions, based on cadmium sulfide. Results comparable to those of Example 2 were obtained.

*Example 13*

Example 6 is repeated with the exception that a mixture of elemental cadmium and elemental selenium is substituted for cadmium selenide. The elements are present in the mixture in stoichiometric proportions, based on cadmium selenide. Results similar to those of Example 6 are obtained.

*Example 14*

Example 7 is repeated with the exception that a mixture of elemental cadmium and elemental tellurium is substituted for cadmium telluride. The elements are present in the mixture in stoichiometric proportions, based on cadmium telluride. Results similar to those of Example 7 are obtained.

Although in Examples 12 to 14, the elements are present in the mixture in stoichiometric proportions, it should be understood that any of the elements may be present in greater than or less than stoichiometric proportions. Thus, for example, the given equivalent weight ratio of one element to another element in the mixture of the embodiment under discussion may vary between about 0.1 and 10 to 1, or even more.

Utilizing a stoichiometric excess of one element or another in the mixture will lead to greater flexibility in shifting the peak spectral response of the multi-layered elements when the ion exchange technique described herein is employed as will be readily understood by those skilled in the art.

The invention in its broader aspects is not limited to the specific articles and processes shown and described but departures may be made therefrom within the scope of the accompanying claims without departing from the principles of the invention and without sacrificing its chief advantages.

What is claimed is:

1. A method of forming photosensitive elements from host photoconductive materials, said elements having predetermined peak response wave length and bandwidth which are different from the peak response wave length and bandwidth of the host photoconductive materials, which comprises: depositing a first stratum of a host photoconductive material on a support, heating the deposited stratum in the presence of halogen and cooling the stratum to ambient temperature; repeating the procedure to impose at least one additional stratum of host polycrystalline material on the first stratum, and contacting the deposited photoconductive material with vapors of a substance other than the anion of the host photoconductive material, said substance being selected from the group consisting of selenium, tellurium, sulfur and mixtures thereof.

2. The method of claim 1 wherein the contact between said vapors and the deposited photoconductive material occurs during the final heating step.

3. The method of claim 1 wherein the contact between said vapors and the deposited photoconductive material occurs while the strata are being heated in the presence of halogen.

4. The method of claim 1 wherein the deposited host photoconductive material includes a substance selected from the group consisting of sulfides, selenides, and tellurides of zinc and mixtures thereof.

5. The method of claim 1 wherein the deposited host photoconductive material includes a mixture of elemental sulfur and a substance selected from the group consisting of elemental cadmium, zinc and mercury.

6. The method of claim 1 wherein the thickness of each stratum of host photoconductive material is between about 1.5 to 4.5 microns.

7. The method of claim 1 wherein the process is continued until four layers are each deposited, heated in the presence of halogen and cooled to ambient temperatures.

8. The method of claim 1 wherein the host polycrystalline material includes activators.

9. The method of claim 1 wherein the host photoconductive material is polycrystalline.

10. The method of claim 1 wherein the heating is carried out in the presence of chloride.

11. The method of claim 1 wherein the deposited host photoconductive material includes a substance selected from the group consisting of sulphides, selenides and tellurides of mercury, and mixtures thereof.

12. The method of claim 1 wherein the deposited host photoconductive material includes a mixture of elemental tellurium and a substance selected from the group consisting of elemental cadmium, zinc and mercury.

13. The method of claim 1 wherein the deposited host photoconductive material includes a mixture of elemental selenium and a substance selected from the group consisting of elemental cadmium, zinc and mercury.

14. A method of forming photosensitive elements from host photoconductive materials, said elements having predetermined peak response wave length and bandwidth which are different from the peak response wave length and bandwidth of the host photoconductive materials, which comprises depositing on a support a host photoconductive material consisting essentially of cadmium sulphide, heating the deposited stratum in the presence of a halogen and cooling the stratum to ambient temperature; repeating the procedure to impose on the first stratum at least one additional stratum of host polycrystalline material consisting essentially of cadmium sulphide, and contacting the deposited photoconductive material with vapors of elements selected from the group consisting of selenium, tellurium, and mixtures thereof.

15. A method of forming photosensitive elements from host photoconductive materials, said elements having predetermined peak response wave length and bandwidth which are different from the peak response wave length and bandwidth of the host photoconductive materials, which comprises depositing on a support a host photoconductive material consisting essentially of cadmium selenide, heating the deposited stratum in the presence of a halogen and cooling the stratum to ambient temperature; repeating the procedure to impose on the first stratum at least one additional stratum of host polycrystalline material consisting essentially of cadmium selenide, and contacting the deposited photoconductive material with vapors of elements selected from the group consisting of sulfur, tellurium, and mixtures thereof.

16. A method of forming photosensitive elements from host photoconductive materials, said elements having predetermined peak response wave length and bandwidth which are different from the peak response wave length and bandwidth of the host photoconductive materials, which comprises depositing on a support a host photoconductive material consisting essentially of cadmium telluride, heating the deposited stratum in the presence of a halogen and cooling the stratum to ambient temperature; repeating the procedure to impose on the first stratum at least one additional stratum of host polycrystalline material consisting essentially of cadmium telluride, and contacting the deposited photoconductive material with vapors of elements selected from the group consisting of sulfur, selenium, and mixtures thereof.

References Cited in the file of this patent

UNITED STATES PATENTS 2,879,362 Meyer ---------------- Mar. 24, 1959

FOREIGN PATENTS 919,727 Germany -------------- May 23, 1955